(12) United States Patent
Kim et al.

(10) Patent No.: US 9,153,809 B2
(45) Date of Patent: Oct. 6, 2015

(54) SECONDARY BATTERY INCLUDING RETAINER FOR ELECTRODE ASSEMBLY

(71) Applicants: Dukjung Kim, Yongin-si (KR); Joongheon Kim, Yongin-si (KR); In Kim, Yongin-si (KR)

(72) Inventors: Dukjung Kim, Yongin-si (KR); Joongheon Kim, Yongin-si (KR); In Kim, Yongin-si (KR)

(73) Assignees: SAMSUNG SDI CO., LTD., Yongin-si, Gyeonggi-do (KR); ROBERT BOSCH GmbH, Stuttgart (DE)

(\*) Notice: Subject to any disclaimer, the term of this patent is extended or adjusted under 35 U.S.C. 154(b) by 299 days.

(21) Appl. No.: 13/649,684

(22) Filed: Oct. 11, 2012

(65) Prior Publication Data

US 2013/0288101 A1    Oct. 31, 2013

(30) Foreign Application Priority Data

Apr. 27, 2012  (KR) .................. 10-2012-0044782

(51) Int. Cl.
```
H01M 2/18       (2006.01)
H01M 2/26       (2006.01)
H01M 10/04      (2006.01)
H01M 2/20       (2006.01)
H01M 2/02       (2006.01)
H01M 10/0583    (2010.01)
```

(52) U.S. Cl.
CPC ........ *H01M 2/18* (2013.01); *H01M 2/26* (2013.01); *H01M 10/0413* (2013.01); *H01M 2/02* (2013.01); *H01M 2/20* (2013.01); *H01M 2/263* (2013.01); *H01M 10/0431* (2013.01); *H01M 10/0583* (2013.01)

(58) Field of Classification Search
None
See application file for complete search history.

(56) References Cited

U.S. PATENT DOCUMENTS

| | | | |
|---|---|---|---|
| 7,892,669 B2 * | 2/2011 | Yang et al. | 429/100 |
| 2007/0196729 A1 | 8/2007 | Yamauchi et al. | |
| 2007/0281208 A1 | 12/2007 | Yoon et al. | |
| 2011/0129720 A1 | 6/2011 | Yun | |
| 2012/0156550 A1 * | 6/2012 | Guen | 429/163 |

FOREIGN PATENT DOCUMENTS

| | | |
|---|---|---|
| JP | 2011-049066 A | 3/2011 |
| KR | 10-2007-0083415 A | 8/2007 |
| KR | 10-2011-0061315 A | 6/2011 |

\* cited by examiner

*Primary Examiner* — Miriam Stagg
*Assistant Examiner* — Carmen Lyles-Irving
(74) *Attorney, Agent, or Firm* — Lee & Morse, P.C.

(57) ABSTRACT

A secondary battery includes an electrode assembly includes first and second electrode non-coating portions exposed from respective sides of an electrode assembly, first and second collecting plates in contact with and fixed to the respective first and second electrode non-coating portions, a retainer including first and second fixing slits that accommodate the first and second collecting plates connected to the electrode assembly, respectively, and a case that accommodates the retainer accommodating the electrode assembly and the first collecting plate. The retainer includes a first side part including the first fixing slit, a second side part facing the first side part and including the second fixing slit, and a bottom part connecting the first and second side parts to each other.

17 Claims, 7 Drawing Sheets

SECONDARY BATTERY INCLUDING RETAINER FOR ELECTRODE ASSEMBLY

CROSS-REFERENCE TO RELATED APPLICATION

This application claims priority under 35 U.S.C. §119 to Korean Patent Application No. 10-2012-0044782 filed on Apr. 27, 2012, in the Korean Intellectual Property Office, and entitled: "Secondary battery," the disclosure of which is incorporated herein in its entirety by reference.

BACKGROUND

1. Field

Embodiments relate to a secondary battery.

2. Description of the Related Art

Secondary batteries are rechargeable, unlike primary batteries. Of these secondary batteries, a low capacity battery including a battery cell in the form of a pack may be used in portable small electronic devices such as cellular phones and camcorders, and a high capacity battery including tens of battery cells connected to one another may be used as a motor-driving power source for electric scooters, hybrid vehicles, or electric vehicles.

Secondary batteries may be manufactured in various shapes, such as a cylindrical shape and a prismatic shape. An electrolyte and an electrode assembly formed by interposing a separator as an insulator between a positive electrode plate and a negative electrode plate are accommodated in a case, and a cap plate is installed on the case, so as to form a secondary battery. The electrode assembly may be connected with a positive terminal and a negative terminal, which protrude through the cap plate and are exposed to the exterior of the electrode assembly.

SUMMARY

Embodiments are directed to a secondary battery that includes an electrode assembly including a first electrode plate including a first electrode non-coating portion, a second electrode plate including a second electrode non-coating portion, and a separator disposed between the first and second electrode plates, wherein the first electrode non-coating portion and the second electrode non-coating portion are exposed from sides of the electrode assembly, respectively, a first collecting plate and a second collecting plate that are in contact with and fixed to the first electrode non-coating portion and the second electrode non-coating portion, respectively, a retainer including a first fixing slit and a second fixing slit that accommodate the first and second collecting plates connected to the electrode assembly, respectively, a case that accommodates the retainer accommodating the electrode assembly and the first collecting plate, the case having an upper opening, and a cap plate closing the upper opening of the case accommodating the electrode assembly, the first and second collecting plates, and the retainer. The retainer includes a first side part including the first fixing slit, a second side part facing the first side part and including the second fixing slit, and a bottom part connecting the first and second side parts to each other.

The retainer may be formed of an insulating material.

The first collecting plate may include a first flat region having a plate shape, the first collecting plate being accommodated in the first fixing slit of the retainer, a second flat region bent from an upper end of the first flat region, and extended at an upper portion of the first collecting plate, and a contact region bent and extended from a side portion of the first flat region toward the electrode assembly, the contact region being in contact with and welded to the first electrode non-coating portion of the electrode assembly.

The second flat region of the first collecting plate may include a terminal hole that receives a first electrode terminal exposed to an upper side of the cap plate.

The first side part of the retainer may include a first flat plate part having a plate shape and two side ends, the first side part being angled from and connected to the bottom part, and a second flat plate part spaced a predetermined distance from the first flat plate part so as to form the first fixing slit therebetween, the second flat plate part being angled from and fixed to the bottom part.

The first flat plate part may include first protrusions at both side ends thereof, and the first protrusions may protrude toward the electrode assembly to fix the first collecting plate.

The first protrusion may be in contact with and fixed to the bottom part, and be extended at a predetermined angle from the first flat plate part.

The first protrusion may be perpendicular to the first flat plate part.

The second flat plate part of the first side part may be between the first protrusions, and may be spaced a predetermined distance therefrom so as to form first auxiliary slits therebetween.

The second flat plate part of the first side part may include at least two plates flush with each other. The plates may be spaced apart from each other so as to form a first auxiliary slit, and may be fixed to the bottom part.

The contact region of the first collecting plate may be welded to the first electrode non-coating portion of the electrode assembly, and may be accommodated in the first auxiliary slit of the second flat plate part.

The second flat plate part of the first side part may include a first recess that has a shape corresponding to a corner of the electrode assembly at which the first electrode non-coating portion protrudes. The electrode assembly may be fixed in the recess.

The electrode assembly may include at least two electrode assemblies, the at least two electrode assemblies being electrically connected to the first and second collecting plates.

The second flat plate part of the first side part may include at least two first recesses in which the at least two electrode assemblies are fixed. A first wing may be disposed between the first recesses to fix the electrode assemblies.

The first side part and the second side part may be integral with the bottom part.

The bottom part may have a plate shape. The first side part and the second side part may be perpendicular to the bottom part.

BRIEF DESCRIPTION OF THE DRAWINGS

Features will become apparent to those of skill in the art by describing in detail exemplary embodiments with reference to the attached drawings in which.

DETAILED DESCRIPTION

Figure 1A:
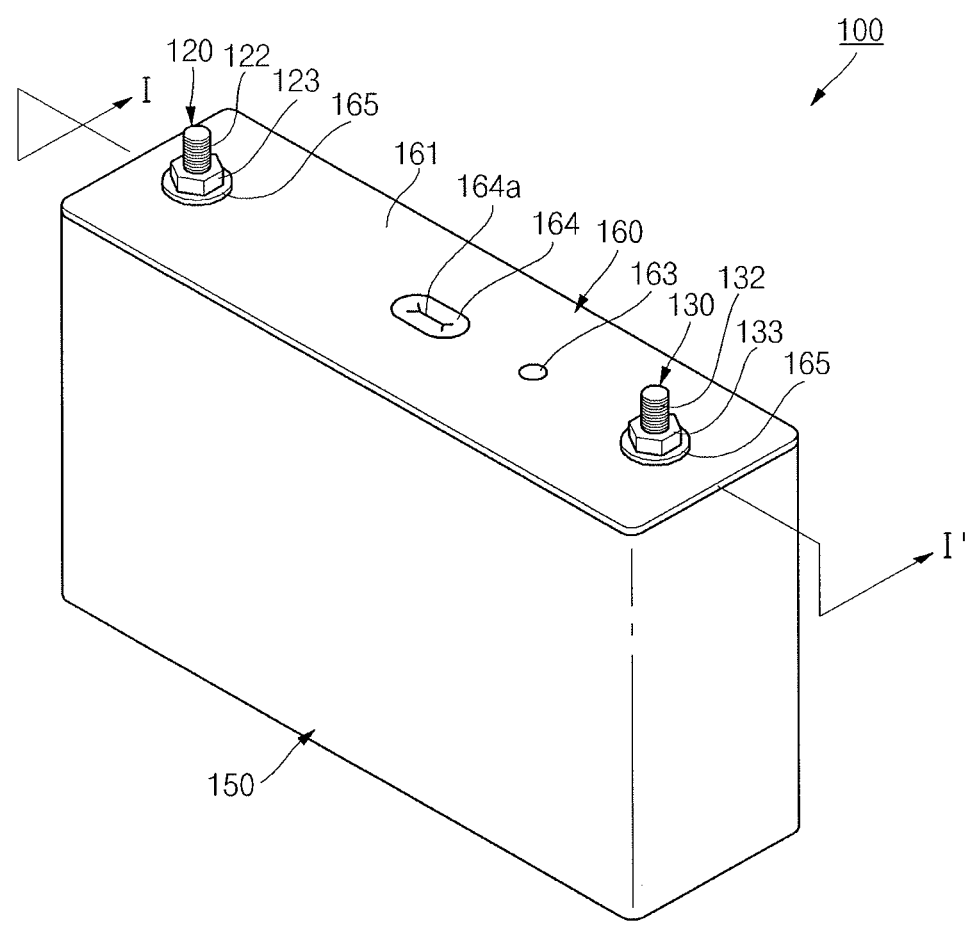
FIG. 1A illustrates a perspective view of a secondary battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. Like reference numerals refer to like elements throughout.

Figure 1B:
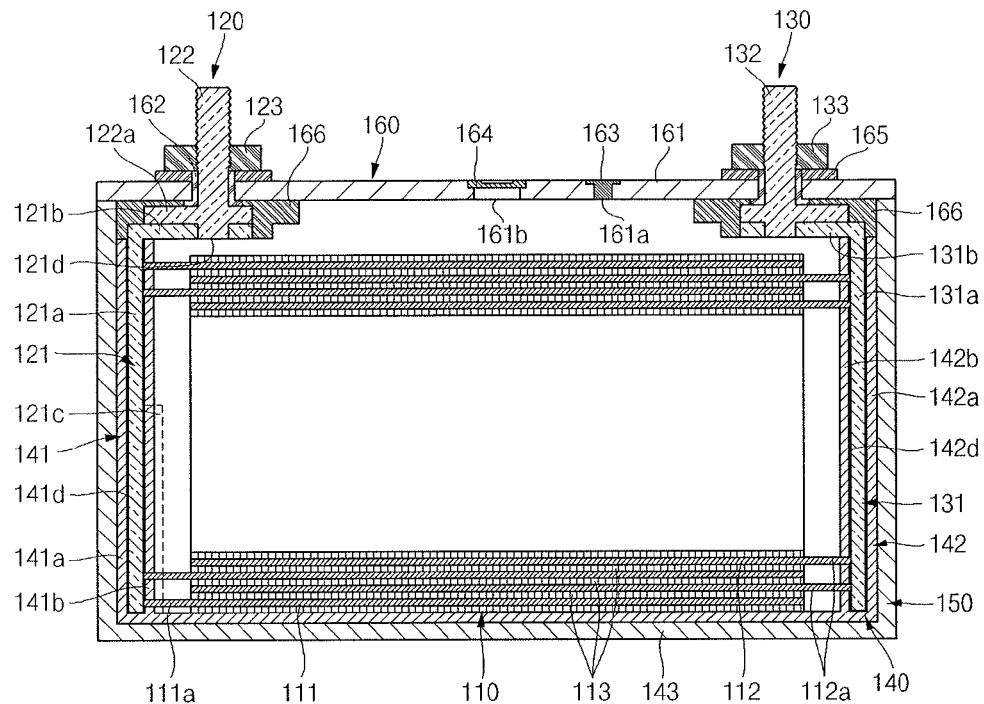
FIG. 1B illustrates a cross-sectional view taken along line I-I' of FIG. 1A.

FIG. 1A illustrates a perspective view of a secondary battery according to an embodiment. FIG. 1B illustrates a cross-sectional view taken along line I-I' of FIG. 1A.

Referring to FIGS. 1A and 1B, a secondary battery 100 according to the current embodiment may include an electrode assembly 110, a first terminal part 120, a second terminal part 130, a retainer 140, a case 150, and a cap assembly 160.

The electrode assembly 110 may be formed by winding or stacking a first electrode plate 111, a separator 113, and a second electrode plate 112, which may have a thin plate or film shape. The first electrode plate 111 may function as a positive electrode or a negative electrode, and the second electrode plate 112 may have an opposite polarity from the first electrode plate 111.

The first electrode plate 111 may be formed by applying a first electrode active material, such as a transition metal oxide, on a first electrode collector plate formed of metal foil, such as aluminum foil. The first electrode plate 111 may include a first electrode non-coating portion 111a on which the first electrode active metal is not applied. The first electrode non-coating portion 111a may function as a passage for current flowing between the first electrode plate 111 and the outside of the first electrode plate 111. Various suitable materials may be used to form the first electrode plate 111.

The second electrode plate 112 may be formed by applying a second electrode active material, such as graphite or carbon, on a second electrode collector plate formed of metal foil, such as nickel or copper foil. The second electrode plate 112 may include a second electrode non-coating portion 112a on which the second electrode active metal is not applied. The second electrode non-coating portion 112a may function as a passage for current flowing between the second electrode plate 112 and the outside of the second electrode plate 112. Various suitable materials may be used to form the second electrode plate 112.

In other implementations, the relative polarities of the first and second electrode plates 111 and 112 may differ from what is described above. What is described as an active material for the first electrode may be used instead as the active material of the second electrode and what is described as an active material for the second electrode may be used instead as the active material of the first electrode.

The separator 113 may be disposed between the first electrode plate 111 and the second electrode plate 112 to prevent short circuiting and allow the movement of lithium ions. The separator 113 may be formed of polyethylene, polypropylene, or combined film of polypropylene and polyethylene, as examples.

Ends of the electrode assembly 110 may be respectively coupled to the first and second terminal parts 120 and 130, which may be electrically connected to the first and second electrode plates 111 and 112, respectively.

The electrode assembly 110 and electrolyte are accommodated within the case 150. The electrolyte may include an organic solvent such as ethylene carbonate (EC), propylene carbonate (PC), diethyl carbonate (DEC), ethyl methyl carbonate (EMC), or dimethyl carbonate (DMC), and a lithium salt such as $LiPF_6$ or $LiBF_4$. The electrolyte may be a liquid, a solid, or a gel.

The first terminal part 120 may be formed of a metal or an equivalent thereof, and may be electrically connected to the first electrode plate 111. The first terminal part 120 may include a first collecting plate 121, a first electrode terminal 122, and a first coupling member 123.

The first collecting plate 121 may contact the first electrode non-coating portion 111a protruding from an end of the electrode assembly 110. The first collecting plate 121 may be welded to the first electrode non-coating portion 111a. The first collecting plate 121 may have an approximately 'L' shape, and a terminal hole 121d may be formed in the upper portion thereof. The first electrode terminal 122 may be fitted in the terminal hole 121d. The first collecting plate 121 may be formed of aluminum or an aluminum alloy, as examples.

In more detail, the first collecting plate 121 may include a first flat region 121a, a second flat region 121b, and a plurality of contact regions 121c. The first flat region 121a may have a plate shape accommodated in a first fixing slit 141d of the retainer 140, and may stand approximately straight up. The second flat region 121b may be bent about 90° from the upper end of the first flat region 121a, and may be horizontally extended for a predetermined length. The second flat region 121b may be provided with the terminal hole 121d to which the first electrode terminal 122 may be coupled. The contact region 121c may be bent about 90° from a side portion of the first flat region 121a, and may be extended a predetermined length to contact the first electrode non-coating portion 111a of the electrode assembly 110 so that the contact region 121c can be welded thereto. The structure of such a collecting plate will be described below in more detail.

The first electrode terminal 122, passing through a cap plate 161 to be described below, may protrude upwardly for a predetermined length and electrically connect to the first collecting plate 121 at the lower side of the cap plate 161. The first electrode terminal 122 protruding the predetermined length to the upper side of the cap plate 161 may include a flange 122a at the lower side of the cap plate 161. The flange 122a may extend laterally to prevent the removal of the first electrode terminal 122 from the cap plate 161. The lower portion of the first electrode terminal 122 with respect to the flange 122a may be fitted in the terminal hole 121d of the first collecting plate 121, and may be riveted or welded. The upper portion of the first electrode terminal 122 with respect to the flange 122a may pass through the cap plate 161, and protrude upwardly for a predetermined length so that the first coupling member 123 can be fixed thereto. The upper portion of the first electrode terminal 122 may be provided with a screw thread, so that the first coupling member 123 can be screwed thereto. The first electrode terminal 122 may be electrically insulated from the cap plate 161. For example, the first electrode terminal 122 may be formed of any suitable material, such as aluminum, an aluminum alloy, or an equivalent thereof.

The first coupling member 123 may be provided in the form of an approximately hexagonal nut, and may have an approximately vertical through hole in the central portion thereof, so that the first electrode terminal 122 can be passed through the through hole, and be coupled thereto. The first coupling member 123 may be formed of any suitable material, such as stainless steel, copper, a copper alloy, aluminum, an aluminum alloy, or an equivalent thereof. The first coupling member 123 and the cap plate 161 may be electrically insulated from each other.

The second terminal part 130 may be formed of a metal or an equivalent thereof, and may be electrically connected to the second electrode plate 112. The second terminal part 130 may include a second collecting plate 131, a second electrode terminal 132, and a second coupling member 133. The second terminal part 130 may have the same shape as that of the first terminal part 120. Thus, a detailed description thereof will not be repeated.

The second collecting plate 131 may include a first flat region 131a, a second flat region 131b, and a plurality of contact regions 131c and 131e. The first flat region 131a may have a plate shape accommodated in a second fixing slit 142d of the retainer 140, and may stand approximately straight up. The second flat region 131b may be bent about 90° from the upper end of the first flat region 131a, and may be horizontally extended for a predetermined length. The second flat region 131b may be provided with a terminal hole 131d to which the second electrode terminal 132 is coupled. The contact regions 131c and 131e may be bent about 90° from a side portion of the first flat region 131a, and may extend for a predetermined length to contact the second electrode non-coating portion 112a of the electrode assembly 110 so that the contact regions 131c and 131e can be welded thereto. Substantially, the second collecting plate 131 may have the same structure as the first collecting plate 121.

The second collecting plate 131 and the second electrode terminal 132 may be formed of any suitable material, such as copper, a copper alloy, or an equivalent thereof. The second coupling member 133 may be formed of any suitable material such as stainless steel, copper, a copper alloy, aluminum, an aluminum alloy, or an equivalent thereof.

The retainer 140 may be formed of an insulating material, and may include a first side part 141, a second side part 142, and a bottom part 143. The retainer 140 may accommodate the first and second collecting plates 121 and 131 in the first and second side parts 141 and 142, respectively. The electrode assembly 110 welded to the first and second collecting plates 121 and 131 may be accommodated in a space disposed over the bottom part 143.

The bottom part 143 may have an approximately plate shape that extends horizontally. The bottom part 143 may fix and connect the lower ends of the first and second side parts 141 and 142 to each other, and may be integrally formed with the first and second side parts 141 and 142.

The first side part 141 may be angled upward from an end of the bottom part 143, and may stand approximately straight up. The first side part 141 may include a first flat plate part 141a and a second flat plate part 141b, which may be spaced apart from each other to form the first fixing slit 141d that accommodates the first flat region 121a of the first collecting plate 121.

The second side part 142 may be angled upward from the opposite end of the bottom part 143 to the first end, and may stand approximately straight up. The second side part 142 may include a third flat plate part 142a and a fourth flat plate part 142b, which may be spaced apart from each other to form the second fixing slit 142d that accommodates the first flat region 131a of the second collecting plate 131.

Accordingly, the first and second collecting plates 121 and 131 welded to the electrode assembly 110 may be accommodated in the first and second fixing slits 141d and 142d of the first and second side parts 141 and 142 connected by the bottom part 143, thereby fixing and protecting the electrode assembly 110, the first collecting plate 121, and the second collecting plate 131. The bottom part 143 may connect the first and second side parts 141 and 142 to each other so as to prevent torsion of the retainer 140. In addition, the electrode assembly 110 may be accommodated in the space disposed over the bottom part 143 so as to minimize a moving displacement thereof. Accordingly, the retainer 140 may have improved safety and reliability. The retainer 140 will be described below in more detail.

The case 150 may be formed of a conductive metal, such as aluminum, an aluminum alloy, or steel plated with nickel. The case 150 may have an approximately hexahedron shape provided with an opening through which the electrode assembly 110, the first terminal part 120, the second terminal part 130, and the retainer 140 are inserted and placed. Since the case 150 and the cap assembly 160 are illustrated in an assembled state in FIG. 1B, the opening of the case 150 is not shown. It is to be understood that the opening is substantially disposed in an area covered by the cap assembly 160. The inner surface of the case 150 may be treated to be insulated from the electrode assembly 110, the first and second terminal parts 120 and 130, and the cap assembly 160.

The cap assembly 160 may be coupled to the case 150. In detail, the cap assembly 160 may include the cap plate 161, a plurality of seal gaskets 162, a plug 163, a safety vent 164, a plurality of upper insulation members 165, and a plurality of lower insulation members 166. In other implementations, the seal gaskets 162, the upper insulation members 165, and the lower insulation members 166 may be included in the first terminal part 120 and the second terminal part 130.

The cap plate 161 closes the opening of the case 150. The cap plate 161 may be formed of the same material as that of the case 150. The cap plate 161 may be coupled to the case 150 through laser welding, as an example. When the cap plate 161 is electrically connected to the first terminal part 120, the cap plate 161 and the first terminal part 120 may have the same polarity. Accordingly, the case 150 and the cap plate 161 may have the same polarity.

The seal gaskets 162 may be formed of an insulating material, and may be disposed between the cap plate 161 and the first and second electrode terminals 122 and 132 to seal the space between the cap plate 161 and the first and second electrode terminals 122 and 132. The seal gaskets 162 may help to prevent the introduction of moisture into the secondary battery 100 or the leakage of the electrolyte from the secondary battery 100.

The plug 163 may close an electrolyte injection hole 161a of the cap plate 161. The safety vent 164 may be installed in a vent hole 161b of the cap plate 161 and may have a notch 164a to be opened at a set pressure.

The upper insulation members 165 may be disposed between the cap plate 161 and the first and second coupling members 123 and 133. The upper insulation members 165 may tightly contact the cap plate 161. The upper insulation members 165 may also tightly contact the seal gaskets 162. The upper insulation members 165 may insulate the cap plate 161 from the first and second coupling members 123 and 133.

The lower insulation members 166 may be disposed between the cap plate 161 and the first and second collecting plates 121 and 131 to prevent unnecessary short circuiting. That is, the lower insulation members 166 may help to prevent short circuiting between the cap plate 161 and the first collecting plate 121, and short circuiting between the cap plate 161 and the second collecting plate 131. The lower insulation members 166 may also be disposed between the cap plate 161 and the first and second electrode terminals 122 and 132 to help prevent unnecessary short circuiting between the cap plate 161 and the first and second electrode terminals 122 and 132.

Figure 2A:
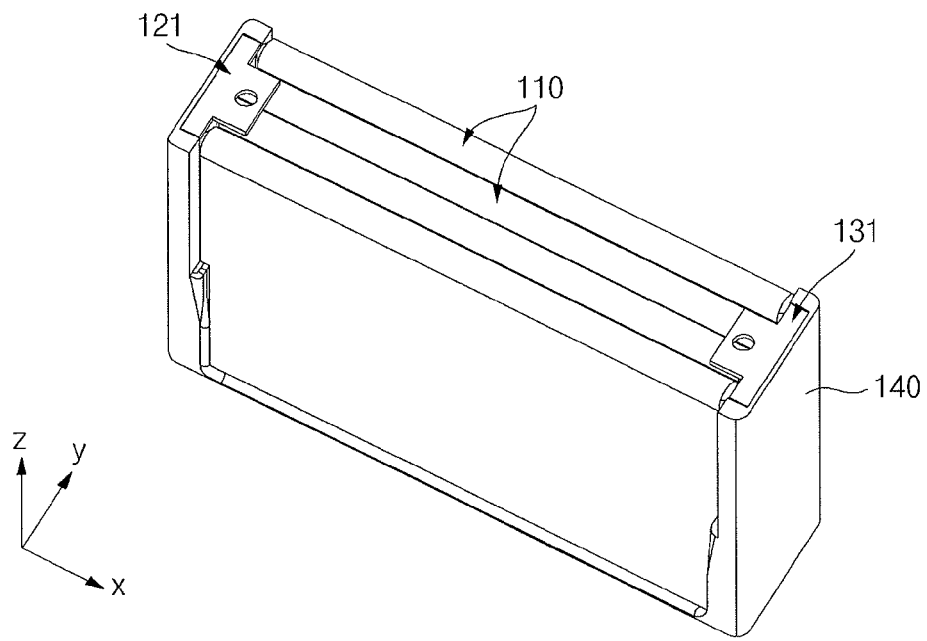
FIG. 2A illustrates a perspective view of electrode assemblies, collecting plates, and a retainer of a secondary battery according to an embodiment.
Figure 2B:
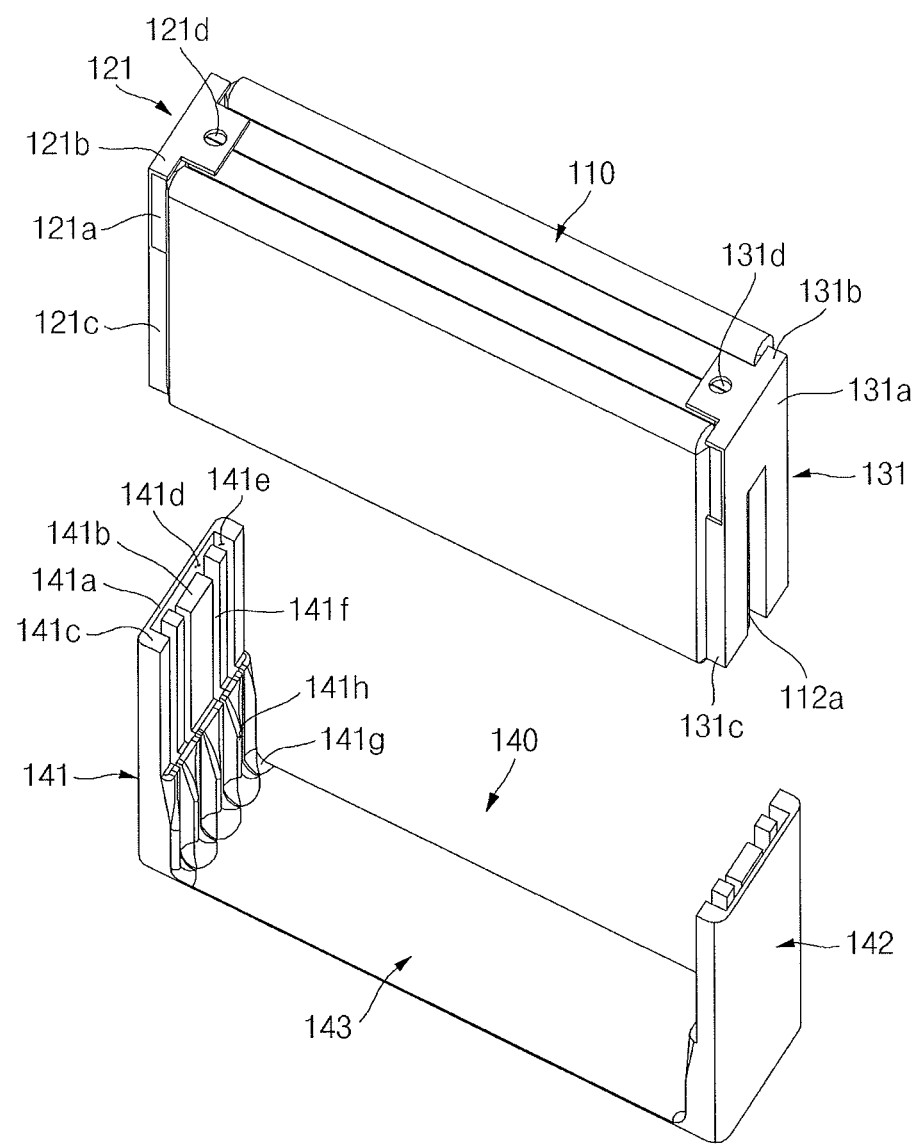
FIGS. 2B and 2C illustrate exploded perspective views of the electrode assemblies, the collecting plates, and the retainer of FIG. 2A.
Figure 2C:
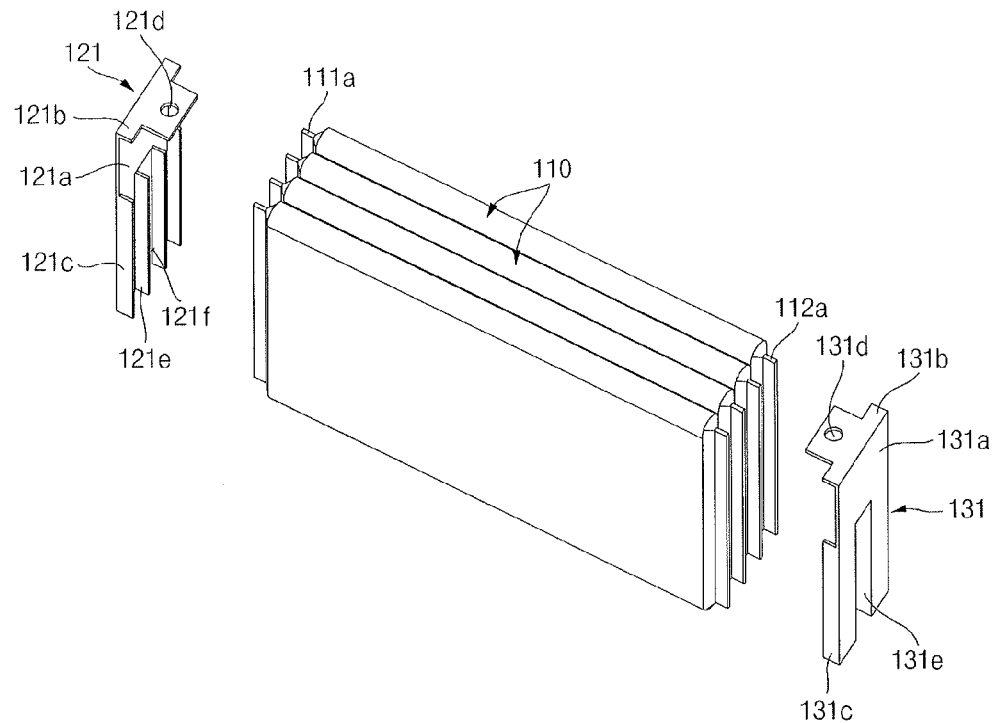
Figure 3A:
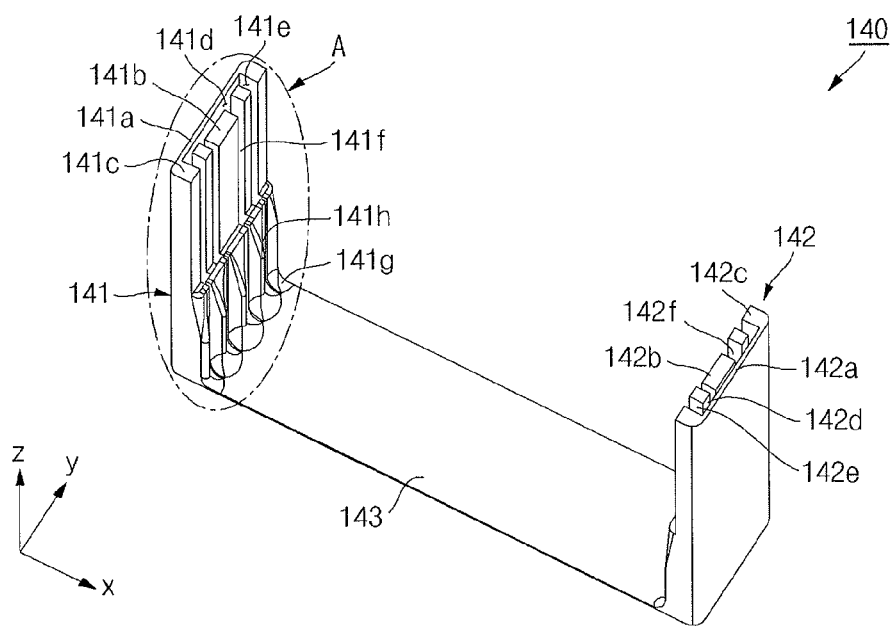
FIGS. 3A to 3D illustrate a perspective view, a plan view, a bottom view, and a front view, respectively, of a retainer of a secondary battery according to an embodiment.
Figure 3B:
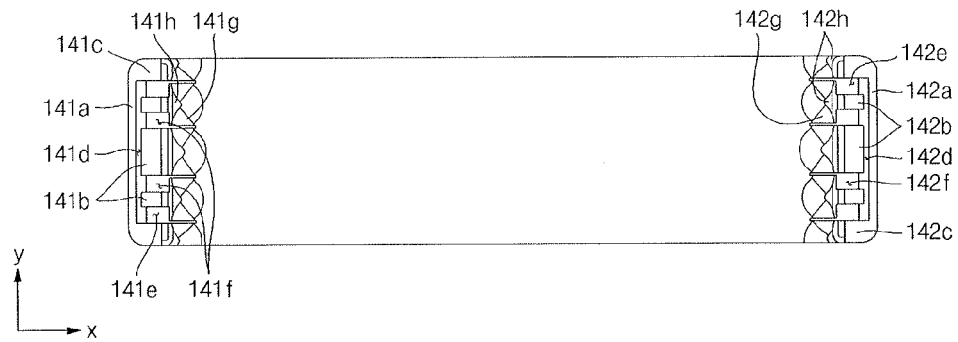
Figure 3C:
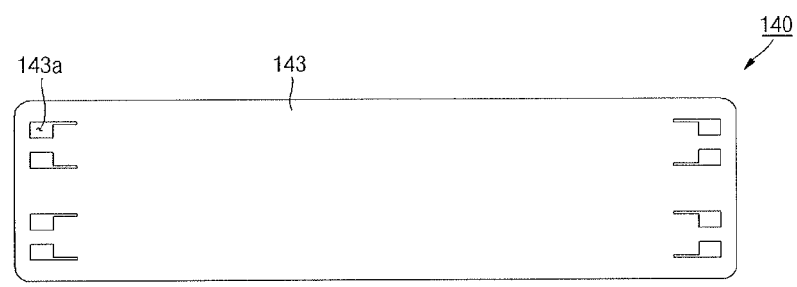
Figure 3D:
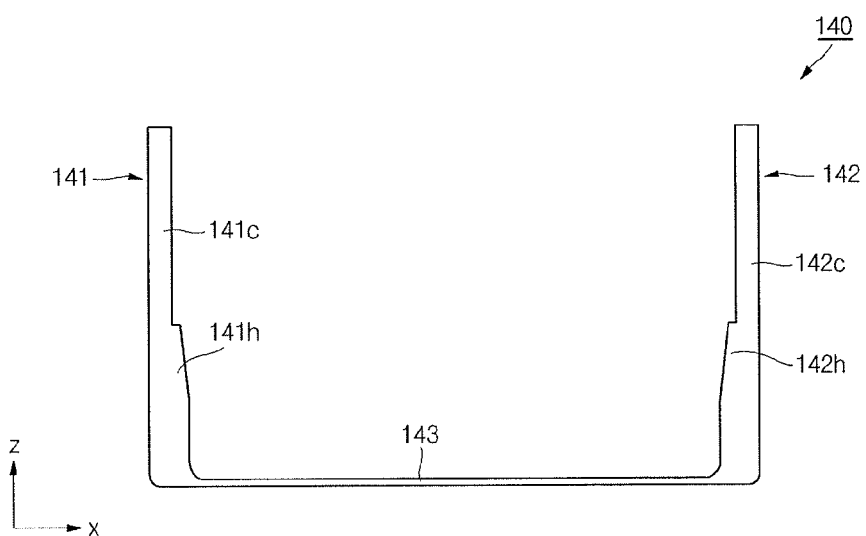

FIGS. 2A to 2C illustrate a perspective view and exploded perspective views of electrode assemblies, collecting plates, and a retainer of a secondary battery according to an embodiment.

Referring to FIGS. 2A to 2C, the retainer 140 may accommodate two or more electrode assemblies 110 that are welded to the first collecting plate 121 and the second collecting plate 131. In FIGS. 2A to 2C, the number of the electrode assemblies 110 is shown to be four, but in other implementations, other numbers of electrode assemblies 110 may be used.

The first electrode non-coating portions 111a protruding from an end of the electrode assemblies 110 may be brought into contact with and welded to the contact regions 121c and contact regions 121e, which are bent and protruded from the first flat region 121a of the first collecting plate 121 toward the electrode assemblies 110.

The number of the contact regions of the first collecting plate 121 may be equal to the number of the electrode assemblies 110. The contact regions 121c may be bent from both side portions of the first flat region 121a toward a central axis of the first flat region 121a. The contact regions 121e may be formed by cutting the first flat region 121a to a predetermined length along the central axis from the lower end of the first flat region 121a, and bending cut portions of the first flat region 121a toward both the side portions of the first flat region 121a. In more detail, before the bending of the cut portions of the first flat region 121a, the first flat region 121a may be laterally cut from an end of the cut portions toward both the side portions of the first flat region 121a. When the cut portions of the first flat region 121a are bent, the first collecting plate 121 may have an opening 121f at the lower side of the central axis thereof.

When the first collecting plate 121 is accommodated in the first fixing slit 141d of the retainer 140, the contact regions 121c and 121e may be accommodated in first auxiliary slits 141f formed in the first side part 141 of the retainer 140. That is, the positions of the contact regions 121c and 121e may correspond to those of the first auxiliary slits 141f. After being welded to the first electrode non-coating portions 111a, the contact regions 121c and 121e may be accommodated in the first auxiliary slits 141f. In other implementations, other configurations of the first collecting plate 121, connecting to other numbers of first electrode non-coating portions 111a of other numbers of electrode assemblies 110 are possible.

The second collecting plate 131 may have the same shape as that of the first collecting plate 121. Thus, a detailed description thereof will not be repeated.

A configuration of the retainer 140 will now be described with reference to FIGS. 2A to 4C.

Figure 4A:
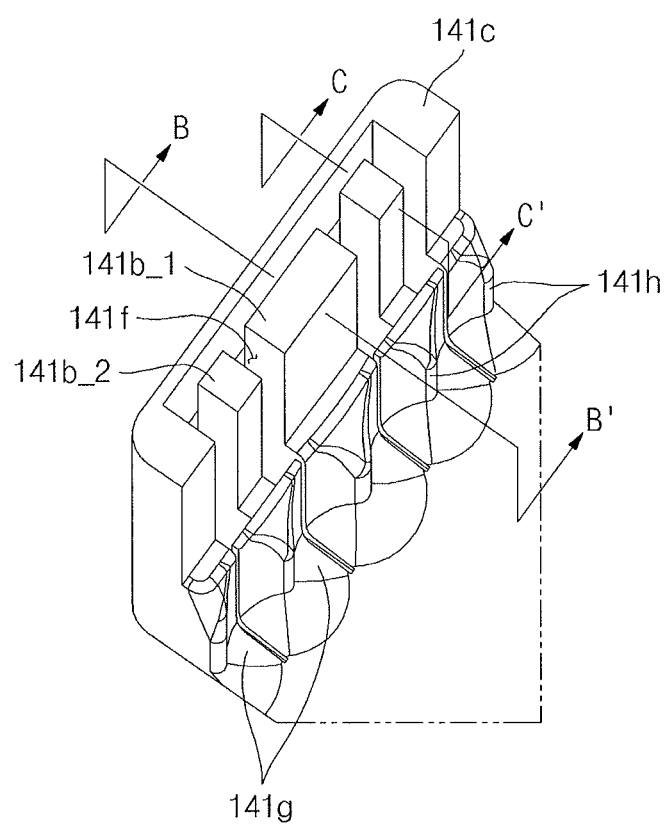
FIG. 4A illustrates an enlarged view of a portion A of FIG. 3A.
Figure 4B:
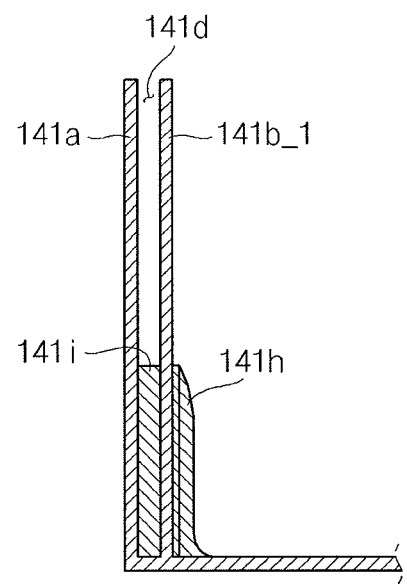
FIG. 4B illustrates a cross-sectional view taken along line B-B' of FIG. 4A.
Figure 4C:
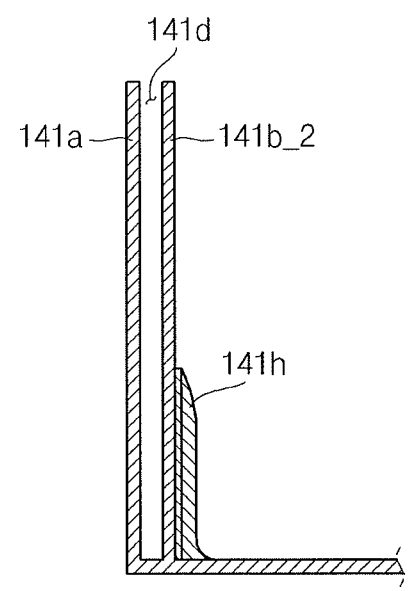
FIG. 4C illustrates a cross-sectional view taken along line C-C' of FIG. 4A.

FIGS. 3A to 3D illustrate a perspective view, a plan view, a bottom view, and a front view, respectively, of a retainer of a secondary battery according to an embodiment. FIG. 4A illustrates an enlarged view of a portion A of FIG. 3A. FIG. 4B illustrates a cross-sectional view taken along line B-B' of FIG. 4A. FIG. 4C illustrates a cross-sectional view taken along line C-C' of FIG. 4A.

The retainer 140 may include the first side part 141, the second side part 142, and the bottom part 143. The first side part 141 and the second side part 142 may be integrally formed with the bottom part 143. The first and second side parts 141 and 142 may be perpendicularly angled upward from both ends of the bottom part 143. The lower ends of the first and second side parts 141 and 142 may be connected to the bottom part 143. The retainer 140 may have a U shape in a cross section or from a front view.

The first and second side parts 141 and 142 may prevent the electrode assembly 110 from moving along an X axis (see, for example, FIG. 2A).

The retainer 140 may accommodate the first and second collecting plates 121 and 131 in the first and second side parts 141 and 142, respectively. The electrode assembly 110 welded to the first and second collecting plates 121 and 131 may be accommodated in the space disposed over the bottom part 143, and thus, the electrode assembly 110 and the first and second collecting plates 121 and 131 may be fixed.

The first side part 141 may be angled upward from an end of the bottom part 143 so as to stand approximately straight up. The first side part 141 may include the first flat plate part 141a and the second flat plate part 141b. The first side part 141 may include a plurality of first protrusions 141c, a plurality of first recesses 141g, and a plurality of first wings 141h. The first protrusions 141c may protrude in a direction from the first flat plate part 141a toward the second flat plate part 141b. The first recesses 141g and the first wings 141h may be disposed between the second flat plate part 141b and the bottom part 143. The first side part 141 may include the first fixing slit 141d between the first and second flat plate parts 141a and 141b, which are spaced a predetermined distance from each other and face each other. The first side part 141 may include first auxiliary slits 141e, each of which may be disposed between the second flat plate part 141b and the first protrusion 141c spaced from each other by a predetermined distance. The second flat plate part 141b may include the first auxiliary slits 141f vertically extending from the lower end thereof to the upper end thereof. The first side part 141 may be integrally formed with the bottom part 143.

The first flat plate part 141a may have a plate shape that is perpendicularly angled and extended from an end of the bottom part 143. The first flat plate part 141a may be integrally formed with the first protrusions 141c, which are disposed at both side ends thereof, and which are angled and extended in the direction from the first flat plate part 141a to the second flat plate part 141b. The first protrusions 141c may be perpendicularly angled from both the side ends of the first flat plate part 141a. That is, the first flat plate part 141a and the first protrusions 141c may form an angled U shape in a plan view. The first protrusions 141c may help to prevent the first collecting plate 121 accommodated in the first fixing slit 141d from moving along a Y axis. The first and second flat plate parts 141a and 141b may help to prevent the first collecting plate 121 accommodated in the first fixing slit 141d from moving along the X axis.

The second flat plate part 141b may be disposed between the first protrusions 141c protruding from both side portions of the first flat plate part 141a. The second flat plate part 141b may face the first flat plate part 141a with a space therebetween so as to form the first fixing slit 141d, and may be fixed to the bottom part 143. The first protrusions 141c may be spaced a predetermined distance from both side ends of the second flat plate part 141b. Accordingly, the first auxiliary slits 141e may be formed.

The second flat plate part 141b fixed to the bottom part 143 may include plates that are coplanar with each other. The plates of the second flat plate part 141b may be spaced apart from each other so as to form the first auxiliary slits 141f. For example, the plates of the second flat plate part 141b may in the form of columns or pillars separated by the first auxiliary slits 141f. The number of the first auxiliary slits 141f may be varied according to the number of the electrode assemblies 110. For example, when the number of the electrode assemblies 110 accommodated in the retainer 140 is four, the number of the first auxiliary slits 141f included in the second flat plate part 141b may be at least two. The second flat plate part 141b may include a center plate part 141b_1 and a plurality of auxiliary plate parts 141b_2 that are flush with the center plate part 141b_1 and are spaced a predetermined distance from both side ends of the center plate part 141b_1. The predetermined distance between the center plate part 141b_1 and the auxiliary plate part 141b_2 may correspond to the first auxiliary slit 141f.

A connecting part 141i may be disposed between the first flat plate part 141a and the lower portion of the center plate part 141b_1. The connecting part 141i may be integrally formed with the first flat plate part 141a and the second flat plate part 141b. The connecting part 141i may extend vertically (along a Z axis) from the bottom part 143, and may have a vertical length smaller than that of the center plate part 141b_1. The connecting part 141i may have a Y axis width equal to or smaller than that of the center plate part 141b_1. The connecting part 141i may help to prevent movement of the center plate part 141b_1. For example, the connecting part 141i may correspond to the opening 121f disposed at the lower side of the central axis of the first collecting plate 121.

The first recesses 141g may be disposed in inner bent portions where the second flat plate part 141b is connected to the bottom part 143, and may have shapes corresponding to lower corners of the electrode assemblies 110 with the first electrode non-coating portions 111a protruding.

The first recesses 141g may correspond to the electrode assemblies 110, and the first wings 141h may be disposed between the electrode assemblies 110 to fix the electrode assemblies 110. The first wings 141h may extend vertically (along the Z axis) from the bottom part 143, and may have a vertical length smaller than that of the second flat plate part 141b.

When the first recesses 141g are arrayed, the first wings 141h may be disposed in protruding regions between the first recesses 141g. The first wings 141h may be integrally formed with the bottom part 143, and may be disposed between side edges of the electrode assemblies 110 adjacent to each other. The first wings 141h may also be disposed on the first protrusions 141c.

The first wings 141h and the first recesses 141g may fix the electrode assemblies 110 and may help to prevent the electrode assembly 110 from being moved or twisted along the Y axis.

The second side part 142 may be angled upward from the opposite end of the bottom part 143 to the first end thereof, so as to stand approximately straight up. The second side part 142 may include the third flat plate part 142a and the fourth flat plate part 142b. The second side part 142 may include a plurality of second protrusions 142c, a plurality of second recesses 142g, and a plurality of second wings 142h. The second protrusions 142c may protrude in a direction from the third flat plate part 142a to the fourth flat plate part 142b. The second recesses 142g and the second wings 142h may be disposed between the fourth flat plate part 142b and the bottom part 143. The second side part 142 may include the second fixing slit 142d between the third and fourth flat plate parts 142a and 142b spaced a predetermined distance from each other and facing each other. The second side part 142 may include second auxiliary slits 142e, each of which may be disposed between the fourth flat plate part 142b and the second protrusion 142c spaced from each other by a predetermined distance. The fourth flat plate part 142b may include second auxiliary slits 142f vertically extending from the lower end thereof to the upper end thereof. The second side part 142 may be integrally formed with the bottom part 143. The second side part 142 may have the same shape as that of the first side part 141. Thus, a detailed description thereof will not be repeated.

The bottom part 143 may include bottom holes 143a in positions corresponding to the first auxiliary slits 141e and 141f. The bottom part 143 may contact the lower portion of the electrode assembly 110. The bottom part 143 may fix and connect the first side part 141 and the second side part 142 to each other. The bottom part 143 may help to prevent the electrode assembly 110 from moving along the Z axis. In this case, the electrode assembly 110 may be fixed with respect to the Z axis between the bottom part 143 and the cap assembly 160. Also, the first and second collecting plates 121 and 131 may be fixed with respect to the Z axis between the bottom part 143 and the cap assembly 160.

As described above, the retainer 140 including the first side part 141, the second side part 142, and the bottom part 143 may fix and protect the electrode assembly 110, the first collecting plate 121, and the second collecting plate 131 with respect to the three axes (X axis, Y axis, and Z axis).

By way of summation and review, a secondary battery according to an embodiment may include a retainer between an electrode assembly and a case, and the retainer may include a first side part including a first fixing slit, a second side part including a second fixing slit, and a bottom part connecting and fixing the lower ends of the first and second side parts. Accordingly, the electrode assembly and collecting plates can be fixed with respect to three axes, thus helping to prevent deformation or bending of the electrode assembly and the collecting plates and minimizing a moving displacement thereof. For example, even when external shock or vibration is transmitted to the secondary battery, the electrode assembly and the collecting plates may be fixed by the retainer with respect to the three axes, thereby helping to prevent movement or deformation thereof within the case.

In addition, the retainer may be formed of an insulating material to reduce or prevent short circuiting between the electrode assembly and the case, thereby improving the safety and reliability of the secondary battery.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A secondary battery, comprising:
   an electrode assembly including a first electrode plate including a first electrode non-coating portion, a second electrode plate including a second electrode non-coating portion, and a separator disposed between the first and second electrode plates, the first electrode non-coating portion and the second electrode non-coating portion being exposed from sides of the electrode assembly, respectively;

a first collecting plate and a second collecting plate that are in contact with and fixed to the first electrode non-coating portion and the second electrode non-coating portion, respectively;

a retainer including a first fixing slit and a second fixing slit that accommodate the first and second collecting plates connected to the electrode assembly, respectively, the retainer having a first side part that includes the first fixing slit, having a second side part that faces the first side part and includes the second fixing slit, and having a bottom part that connects the first and second side parts to each other;

a case that accommodates the retainer accommodating the electrode assembly and the first collecting plate, the case having an upper opening; and a cap plate closing the upper opening of the case accommodating the electrode assembly, the first and second collecting plates, and the retainer.

2. The secondary battery as claimed in claim 1, wherein the retainer includes an insulating material.

3. The secondary battery as claimed in claim 1, wherein the first collecting plate includes:
   a first flat region having a plate shape, the first flat region being accommodated in the first fixing slit of the retainer;
   a second flat region bent from an upper end of the first flat region and extended at an upper portion of the first collecting plate; and
   a contact region bent and extended from a side portion of the first flat region toward the electrode assembly, the contact region being in contact with and welded to the first electrode non-coating portion of the electrode assembly.

4. The secondary battery as claimed in claim 3, wherein the second flat region of the first collecting plate includes a terminal hole that receives a first electrode terminal exposed to an upper side of the cap plate.

5. The secondary battery as claimed in claim 3, wherein the first side part of the retainer includes:
   a first flat plate part having a plate shape and two side ends, the first flat plate being angled from and connected to the bottom part; and
   a second flat plate part spaced a predetermined distance from the first flat plate part so as to form the first fixing slit therebetween, the second flat plate part being angled from and fixed to the bottom part.

6. The secondary battery as claimed in claim 5, wherein the first flat plate part includes first protrusions at both side ends thereof, and the first protrusions protrude toward the electrode assembly to fix the first collecting plate.

7. The secondary battery as claimed in claim 6, wherein the first protrusion is in contact with and fixed to the bottom part, and is extended at a predetermined angle from the first flat plate part.

8. The secondary battery as claimed in claim 7, wherein the first protrusion is perpendicular to the first flat plate part.

9. The secondary battery as claimed in claim 6, wherein the second flat plate part of the first side part is between the first protrusions and is spaced a predetermined distance therefrom so as to form first auxiliary slits therebetween.

10. The secondary battery as claimed in claim 9, wherein the contact region of the first collecting plate is welded to the first electrode non-coating portion of the electrode assembly and is accommodated in the first auxiliary slit of the second flat plate part.

11. The secondary battery as claimed in claim 5, wherein the second flat plate part of the first side part includes at least two plates flush with each other, the plates being spaced apart from each other so as to form a first auxiliary slit, the plates being fixed to the bottom part.

12. The secondary battery as claimed in claim 11, wherein the contact region of the first collecting plate is welded to the first electrode non-coating portion of the electrode assembly and is accommodated in the first auxiliary slit of the second flat plate part.

13. The secondary battery as claimed in claim 5, wherein the second flat plate part of the first side part includes a first recess that has a shape corresponding to a corner of the electrode assembly at which the first electrode non-coating portion protrudes, the electrode assembly being fixed in the first recess.

14. The secondary battery as claimed in claim 13, wherein the electrode assembly includes at least two electrode assemblies, the at least two electrode assemblies being electrically connected to the first and second collecting plates.

15. The secondary battery as claimed in claim 14, wherein:
   the second flat plate part of the first side part includes at least two first recesses in which the at least two electrode assemblies are fixed, and
   a first wing is disposed between the first recesses to fix the electrode assemblies.

16. The secondary battery as claimed in claim 1, wherein the first side part and the second side part are integral with the bottom part.

17. The secondary battery as claimed in claim 1, wherein:
   the bottom part has a plate shape, and
   the first side part and the second side part are perpendicular to the bottom part.

* * * * *